US007636333B2

(12) United States Patent
Jothipragasam

(10) Patent No.: US 7,636,333 B2
(45) Date of Patent: Dec. 22, 2009

(54) METHOD AND APPARATUS FOR CARRIER CUSTOMIZATION IN COMMUNICATION SYSTEMS

(75) Inventor: Premkumar Jothipragasam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 374 days.

(21) Appl. No.: 11/280,718

(22) Filed: Nov. 14, 2005

(65) Prior Publication Data

US 2006/0135144 A1 Jun. 22, 2006

Related U.S. Application Data

(60) Provisional application No. 60/628,768, filed on Nov. 16, 2004.

(51) Int. Cl.
*H04W 4/00* (2006.01)
(52) U.S. Cl. ............ 370/329; 455/168.1; 455/419; 370/335; 370/337; 370/342
(58) Field of Classification Search ........ 370/329, 370/335, 336, 337, 342, 395.5; 455/168.1, 455/419
See application file for complete search history.

(56) References Cited

U.S. PATENT DOCUMENTS

| 6,223,030 B1 * | 4/2001 | Van Den Heuvel et al. ...... 455/435.2 |
| 6,324,400 B1 * | 11/2001 | Shah et al. ............ 455/434 |
| 6,477,372 B1 * | 11/2002 | Otting et al. ............ 455/434 |
| 6,594,505 B1 * | 7/2003 | Ishii ................ 455/552.1 |
| 2003/0148786 A1 * | 8/2003 | Cooper et al. .......... 455/552 |

FOREIGN PATENT DOCUMENTS

| CL | 2975-2005 | 11/2005 |
| GB | 2 294 844 A | 11/1994 |
| KR | 2003-85137 | 11/2003 |
| KR | 2004-80689 | 9/2004 |
| WO | WO 02/063900 A1 | 8/2002 |
| WO | WO 03/067917 A1 | 8/2003 |
| WO | 2006055716 | 5/2006 |

* cited by examiner

*Primary Examiner*—Rafael Pérez-Gutiérrez
*Assistant Examiner*—Nimesh Patel
(74) *Attorney, Agent, or Firm*—Aodollah Katloab; Darren M. Simon

(57) ABSTRACT

A method of customizing a wireless device to a predetermined configuration is described. A wireless device configured with at least one carrier-specific parameter for a first carrier is modified to access at least one carrier-specific parameter for a second carrier during operation of the wireless device and responsive to a predetermined network switch input received by the wireless device. A carrier customization module system for a wireless device includes a carrier customization module loader executed by the wireless device which is configured with at least one carrier-specific parameter for a first carrier. The loader selects at least one carrier-specific parameter for a second carrier from among one or more carrier-specific parameters during operation of the wireless device and responsive to a predetermined network switch input received by the wireless device. The loader modifies the wireless device to access the second carrier using the selected carrier-specific parameter for the second carrier.

16 Claims, 7 Drawing Sheets

METHOD AND APPARATUS FOR CARRIER CUSTOMIZATION IN COMMUNICATION SYSTEMS

CLAIM OF PRIORITY UNDER 35 U.S.C. § 119

The present Application for Patent claims priority to Provisional Application No. 60/628,768, entitled "CARRIER CUSTOMIZATION MODULE (CCM) IN CDMA HANDSET SOFTWARE," filed Nov. 16, 2004, and assigned to the assignee hereof and hereby expressly incorporated by reference herein.

FIELD

The disclosed embodiments relate to wireless communications, and more particularly, to a method and apparatus for carrier customization of a wireless device in a communication system.

BACKGROUND

Different companies manufacture different wireless devices, e.g., cellular telephones, personal digital assistants, etc., for use on one or more telecommunication carrier's communication networks. Many times, particular carriers apply different requirements which devices must meet in order to be able to operate on the carrier's network. Device manufacturers and vendors modify the devices to meet carrier-specific requirements.

FIG. 1 depicts a high level conceptual diagram of a single manufacturer 100 producing multiple wireless devices 102, 104, 106 useable with one or more telecommunication carriers 108, 110, 112. In particular, for each software product, i.e., set of executable instructions, to be distributed for a device 102, 104, 106, the software platform of the device may vary depending not only on the particular device, but also based on with which carrier the device has been configured to operate. As depicted in FIG. 1, device 102 may be configured to operate in conjunction with carriers 108, 110, while device 104 may be configured to operate in conjunction with carrier 110 and device 106 may be configured to operate in conjunction with carriers 108, 112. Because of the number of possible combinations, development of software products for each device 102, 104, 106 may be difficult and expensive as a different version may be necessary for not only each device, but for each carrier, as well.

End users of such wireless devices may desire/need to use the same device in conjunction with different carriers, e.g., better/different service coverage area, pricing, features, etc. After a manufacturer configures a wireless device for a particular carrier, the device user is required to take/send the device to a second carrier to which the user is switching the device for operation. Typically, the second carrier replaces the controlling software of the device with software configured to the second carrier requirements for operating on the carrier's network. This process is time-consuming and inconvenient for the end user and requires additional resources of the second carrier.

SUMMARY

The present embodiments provide a carrier customization module for a wireless device.

A method embodiment of customizing a wireless device to a predetermined configuration includes modifying a wireless device configured with at least one carrier-specific parameter for a first carrier to access at least one carrier-specific parameter for a second carrier during operation of the wireless device and responsive to a predetermined network switch input received by the wireless device.

A carrier customization module system embodiment for a wireless device includes a carrier customization module loader executed by the wireless device which is configured with at least one carrier-specific parameter for a first carrier. The loader selects at least one carrier-specific parameter for a second carrier from among one or more carrier-specific parameters during operation of the wireless device and responsive to a predetermined network switch input received by the wireless device. The loader modifies the wireless device to access the second carrier using the selected carrier-specific parameter for the second carrier.

A wireless device for connection with a communication carrier embodiment includes a computer platform and a carrier customization module. The computer platform is arranged to communicate with a first carrier based on a carrier-specific profile including carrier-specific parameters. The carrier customization module loader is resident on the computer platform and arranged to (a) select at least one carrier-specific parameter from among one or more carrier-specific parameters during operation of the wireless device and (b) configure the computer platform to access a second carrier using the selected carrier-specific parameter on the computer platform.

Another method embodiment of providing a carrier-specific parameter for a first carrier to a wireless device configured with at least one carrier-specific parameter for a second carrier includes transmitting at least one carrier-specific parameter for a first carrier from a server to a wireless device responsive to receipt of a request for the at least one carrier-specific parameter from the wireless device.

A carrier server embodiment for providing a carrier-specific parameter for the first carrier to a wireless device configured with at least one carrier-specific parameter for a second carrier includes a data storage component resident on a computer platform. The data storage component is arranged to be executed by the computer platform and storing at least one carrier-specific parameter for the first carrier. The computer platform is arranged to (a) communicate with the wireless device using an established connection between the wireless device and the second carrier and (2) transmit at least one carrier-specific parameter for the first carrier from a server to the wireless device responsive to receipt of a request for the at least one carrier-specific parameter from the wireless device.

Still other advantages of the embodiments will become readily apparent to those skilled in the art from the following detailed description, wherein the preferred embodiments are shown and described, simply by way of illustration of the best mode contemplated of carrying out the invention. As will be realized, the invention is capable of other and different embodiments, and its several details are capable of modifications in various obvious respects, all without departing from the embodiments.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 2:
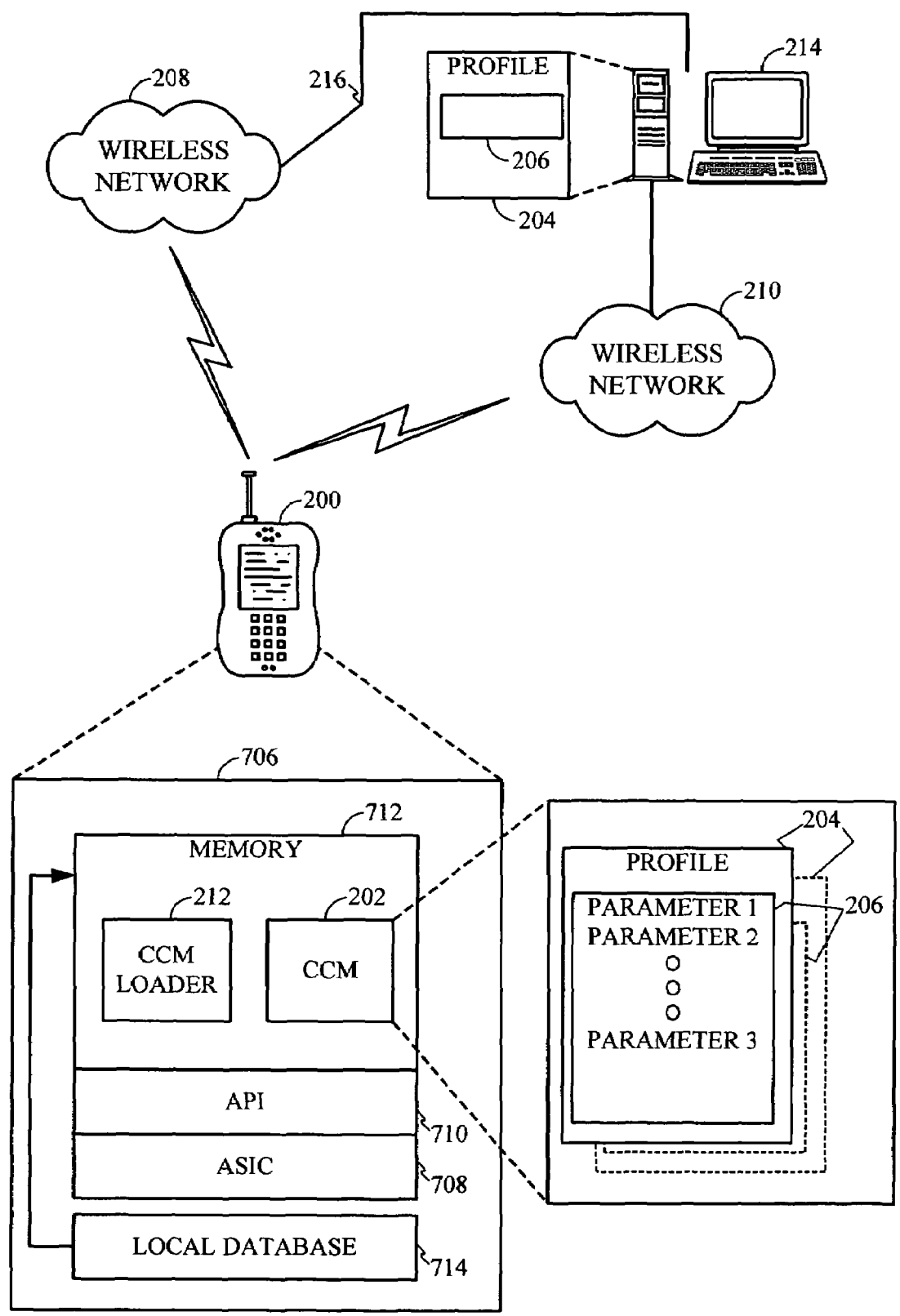
FIG. 2 is a high level conceptual diagram of an embodiment.

FIG. 2 depicts a high level conceptual diagram of an embodiment as described in which a wireless device 200 includes a carrier customization module (CCM) 202 storing a carrier profile 204 including carrier-specific parameters 206 for enabling the device to operate on a particular carrier's communication network, e.g., a first wireless network 208. Network 208 includes a code division multiple access (CDMA) network, a general packet radio service (GPRS) network, a universal mobile telecommunications system (UMTS) network, or other network. Initially, device 200 communicates with a first carrier's wireless network 208 based on CCM 202 contents. Specifically, carrier-specific profile 204 includes parameters 206 which determine operation of device 200 with specific reference to the first carrier's wireless network 208. In an embodiment, parameters 206 control operation of device 200 specifically with respect to the device's communication with network 208 and with respect to the device's interaction with the user. In order to use device 200 in conjunction with a second carrier's wireless network 210, the device's carrier-specific parameters 206 need to be modified according to the requirements of the second carrier.

In an embodiment, a server 214 connected to the second carrier network 210 stores a carrier-specific profile 204 specifying carrier-specific parameters specific to the second carrier for access by device 200. Server 214 stores carrier-specific profile 204 in a storage medium (not shown), e.g., hard disk, memory, floppy disk, or other storage mechanism. Device 200 contacts server 214 of the second carrier and downloads the second carrier's carrier-specific profile 204 for use by the device. Server 214 is accessible to device 200 via wireless network 208 by way of a network connection 216 between the first carrier's wireless network and the second carrier's server. After device 200 downloads the second carrier's profile 204 and is configured based on the carrier-specific parameters, the device is able to communicate with the second carrier's wireless network 210.

Figure 3:
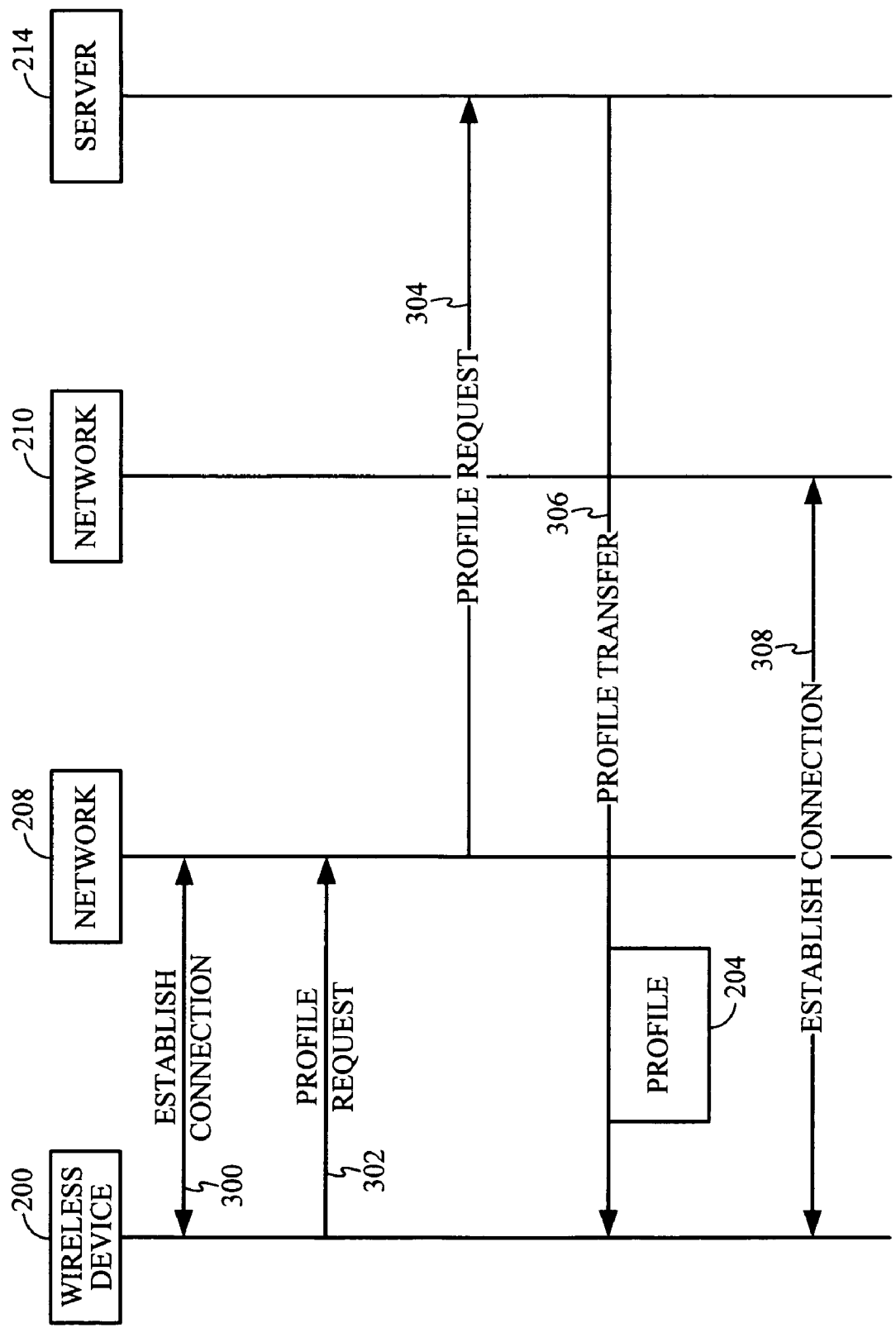
FIG. 3 is a message sequence diagram of operation of an embodiment.

FIG. 3 depicts a message sequence chart of operation of the change of device 200 from communicating with the first carrier's wireless network 208 to the second carrier's wireless network 210. Device 200 establishes a connection (message sequence 300) with wireless network 208. After establishment of the connection, device 200 requests the second carrier's carrier-specific profile 204 from server 214 (message sequence 302, 304) by issuing a profile request message. Responsive to receipt of the profile request message from device 200, server 214 transmits (message sequence 306) profile 204 to device 200 using network 208. After receipt of profile 204, device 200 stores the profile in a storage medium (not shown) of the device and is configured to use the second carrier's profile. After configuration to use the new profile 204, i.e., the second carrier's carrier-specific profile, device 200 is able to establish a connection with the second carrier's network 210 based on the carrier-specific parameters 206 in the profile 204 (message sequence establish connection 308) and is ready for use by the user.

Figure 1:
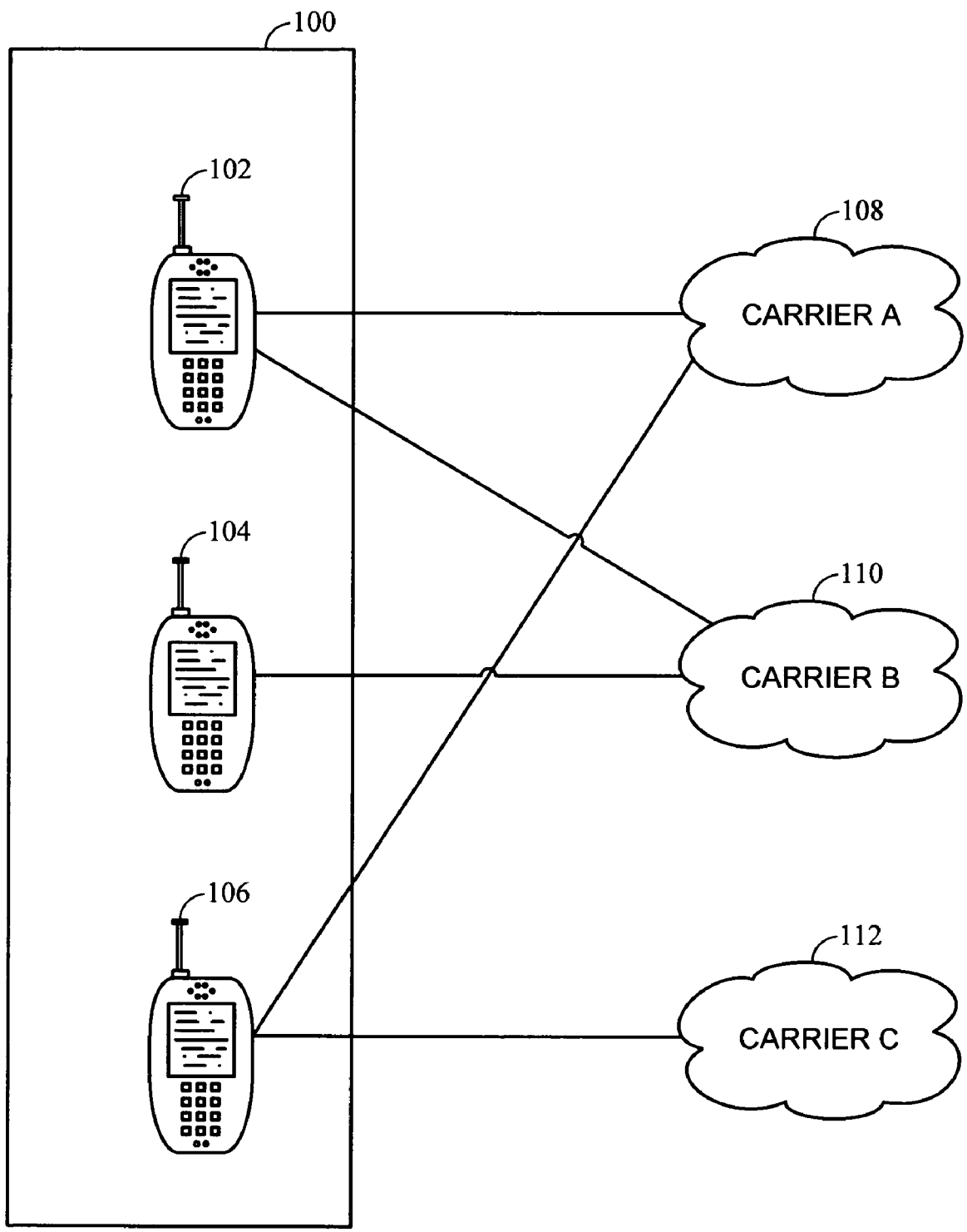
FIG. 1 is a high level conceptual diagram of a wireless device to carrier mapping.

Returning to FIG. 1, in another embodiment, the second carrier's carrier-specific profile 204 is transferred to device 200 using a wired, e.g., cable connection, or wireless, e.g., infra-red protocol, Bluetooth wireless protocol, WiFi protocol, etc. connection to a processing device such as a computer system, e.g., server 214.

In another embodiment, device 200 includes the second carrier's carrier-specific profile 204 (depicted in dotted outline in CCM 202 of the device) in addition to the first carrier's carrier-specific profile at the outset, i.e., as delivered by a manufacturer or vendor, and the device need not download the second carrier's profile in order to access the second network 210. Rather, according to the embodiment, device 200 need only be configured based on the second carrier's carrier-specific parameters located in CCM 202 for the device to be able to communicate with the second carrier's wireless network 210.

Figure 7:
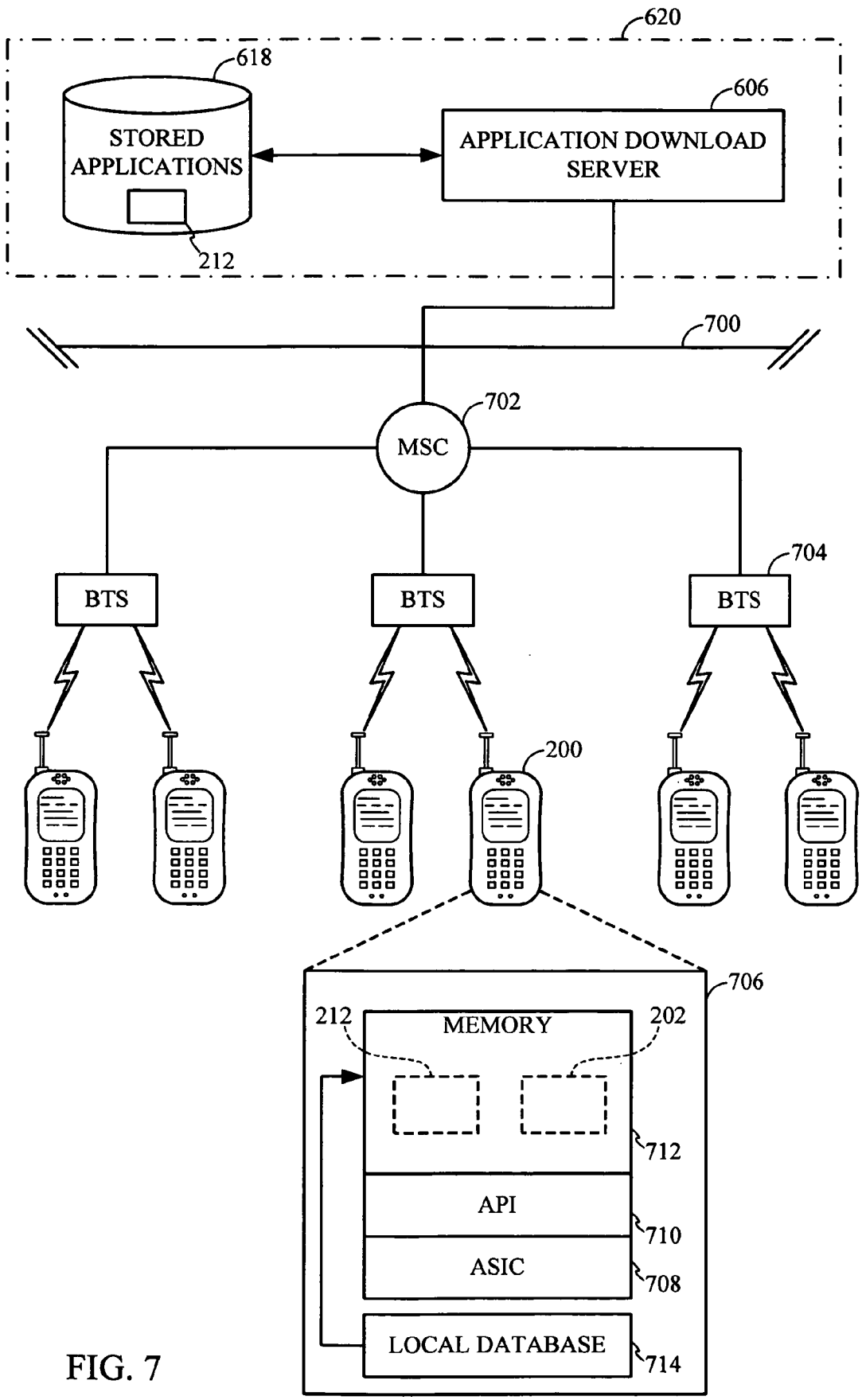
FIG. 7 is a more detailed diagram of a wireless network architecture supporting client devices and servers in accordance with an embodiment.

Device 200 includes a CCM loader 212, a sequence of executable instructions stored in memory 712 (FIG. 7) of device 200 for execution by the device, for receiving, storing, and managing carrier-specific profiles 204 in CCM 202 on the device. In another embodiment, CCM loader 212 is stored as a component of ASIC 708 (FIG. 7) or in local database 714 (FIG. 7). The operation of CCM loader 212 is now described in further detail with reference to FIG. 4.

Figure 4:
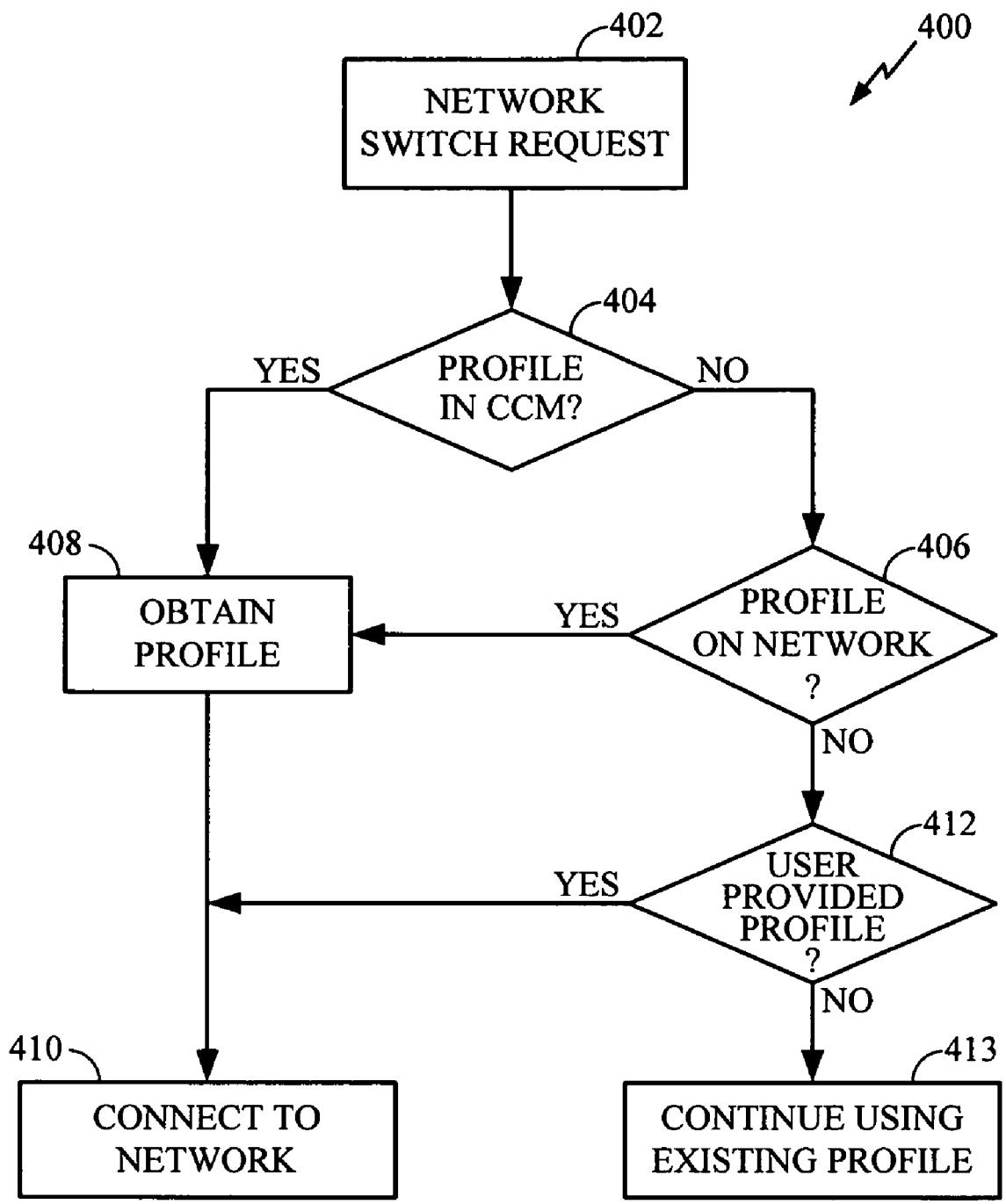
FIG. 4 is a high level functional flow chart of a portion of the process flow of a wireless device of FIG. 2.

FIG. 4 depicts a high level process flow 400 diagram of operation of a portion of CCM loader 212 as executed by device 200. Responsive to a request to change from a first carrier to a second carrier, CCM loader 212 begins the process flow at step 402. Device 200 executing CCM loader 212 receives a request from a user to have the device communicate using a second carrier's wireless network 210. The user request results from user manipulation of device 200, e.g., menu, keypad, button press, voice direction, or other input mechanisms for receiving user commands. In another embodiment, CCM loader 212 responds to a lack of detection of the first carrier's wireless network 208 by device 200 in order to being the process flow at step 402. For example, the user may travel to a different geographic region not covered by the first carrier's service or the user may be in a geographic location in which the first carrier's service area coverage is intermittent.

In an embodiment, the network switch request specifies a particular carrier network 210 with which device 200 is requested to communicate. In another embodiment, the network switch request specifies a particular parameter against which possible networks are to be compared prior to establishing communication with the device. For example, the user may desire to switch to a network providing one or more particular features which the user desires to make use of and which are unavailable or too expensive from the first carrier.

After receiving a network switch request, CCM loader 212 execution proceeds to step 404 wherein the CCM loader queries the CCM 202 to determine if a profile 204 specific to the requested carrier exists in the CCM. In another embodiment, CCM loader queries local database 714 (FIG. 7) for the existence of a profile 204 in addition to CCM 202. If an appropriate carrier-specific profile 204 exists in CCM 202, CCM loader 212 proceeds to step 408 and configures device 200 to make use of the second carrier's carrier-specific parameters 206 as specified in the second carrier's carrier-specific profile 204.

If an appropriate carrier-specific profile 204 does not exist in CCM 202, CCM loader 212 proceeds to step 406 and transmits a query via network 208 to server 214 of the second carrier. If an appropriate carrier-specific profile 204 does not exist or is not available via network 208, the flow of control proceeds to step 412 and prompts the user to provide the second carrier's carrier-specific parameters, e.g., in the form of a second carrier carrier-specific profile 204. In an embodiment, the user manipulates device 200 to cause entry of the second carrier's carrier-specific parameters. In another embodiment, the user provides the second carrier's carrier-specific parameters by connecting a storage medium (not shown) or a computer system (not shown) to device 200 and transferring the profile 204 to device 200. If the user fails to provide a profile 204 to device 200, then at step 413 the device continues to execute instructions using the existing first carrier's carrier-specific profile 204.

If an appropriate carrier-specific profile 204 exists in server 214, CCM loader 212 proceeds to step 408, downloads the profile from the server, and configures device 200 to make use of the second carrier's carrier-specific parameters 206 as specified in the second carrier's carrier-specific profile 204.

After device 200 is configured, the flow of control proceeds to step 410 and the device connects to the second carrier's network 210. In another embodiment, step 410 may be delayed until device 200 attempts to access network 210, e.g., the first attempt by the user to make a call or access other functionality of the network.

In a further embodiment, carrier-specific profile 204 and/or carrier-specific parameters 206 are encrypted and/or digitally signed to prevent unauthorized alteration and/or theft. In a still further embodiment, server 214 performs authentication of device 200 and/or the user of the device prior to transmitting the requested carrier-specific parameter 206 or profile 204 to the device.

Figure 5:
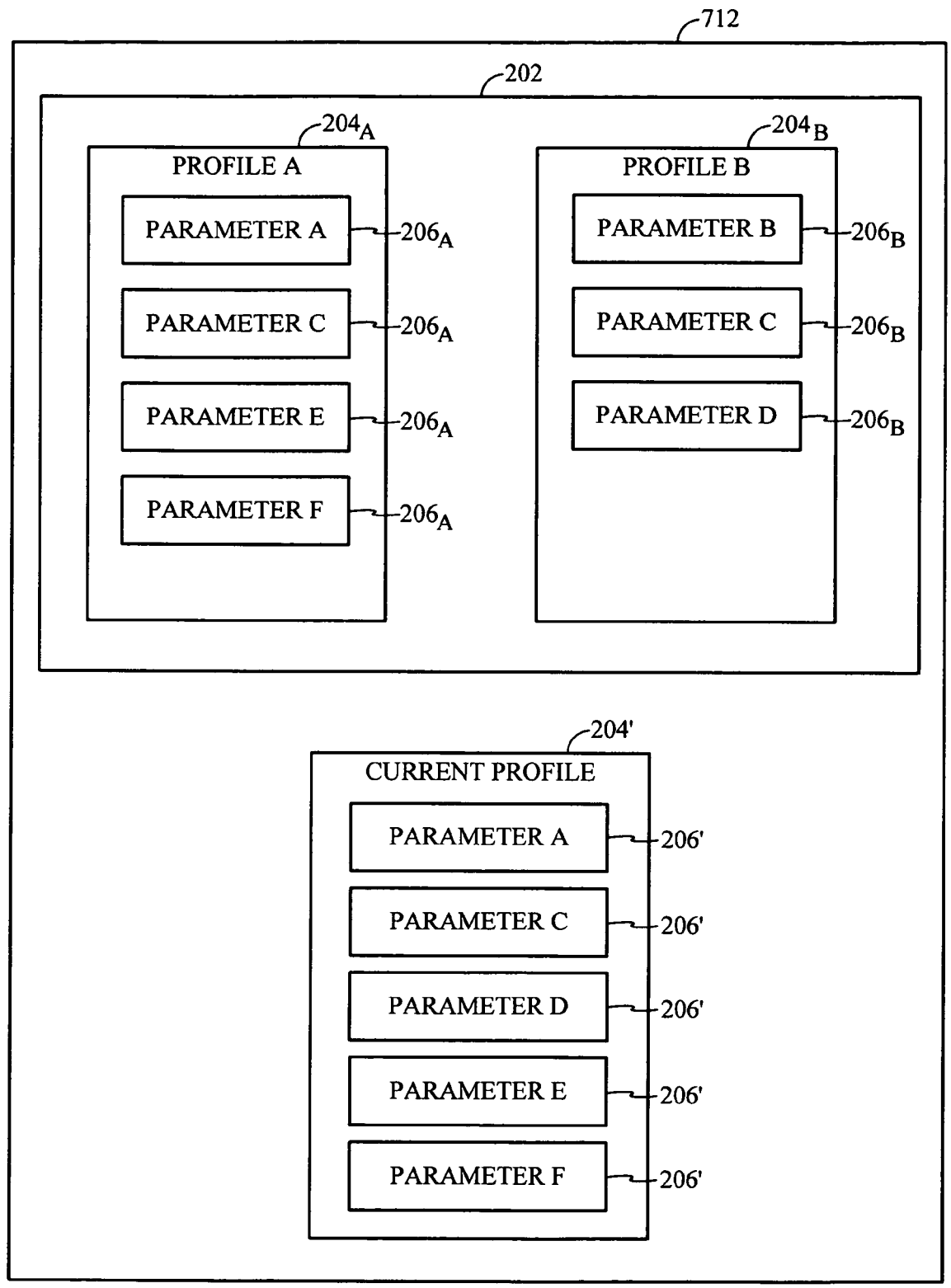
FIG. 5 is a high level block diagram of a portion of a memory of the FIG. 2 embodiment.

FIG. 5 depicts an embodiment of a device 200 memory 712 storing carrier-specific profiles 204', 204A, and 204B including carrier-specific parameters 206', 206A, and 206B, respectively. Generally, as described above, carrier-specific parameters 206 specify device 200 features as determined by a particular carrier, such as device-specific features and carrier-specific features. Device-specific features include display parameters, carrier network determination parameters, dialing feature parameters, user interface parameters, and other device-related parameters.

Display parameters relate to display aspects of device 200 such as character encoding, carrier-specific logo graphics, language support, call timers, etc. Carrier network determination parameters relate to how device 200 determines to which carrier network 208, 210 to connect. In another embodiment, carrier network determination parameters relate to the network switch request determination described above with respect to FIG. 3. Dialing feature parameters relate to user command entry mechanisms such as plus code dialing, international dialing, and other dialing-related aspects. User interface parameters relate to carrier-specified user interface elements and functionality such as interface display styles and layouts. In an embodiment, user interface parameters determine which, and in which order, functionality is displayed to the user.

Carrier-specific features relate to service features including voice parameters, messaging parameters, data parameters, and other carrier-related parameters. Voice parameters include feature codes, notification differences in carrier networks, and other parameters related to voice communication. Messaging parameters include text encoding, maximum message lengths, and other carrier specific messaging specifications. Data parameters include dormancy, and other parameters related to data communication of device 200 with a carrier's network.

With specific reference to FIG. 5, CCM 202 includes a pair of carrier-specific profiles 204A, 204B. With respect to FIG. 5, profile A 204A represents the first carrier's carrier-specific profile and profile B 204B represents the second carrier's carrier-specific profile. Each profile 204A, 204B includes a set of respective parameters 206A, 206B specifying various features and specifications for device 200 operating in connection with the carrier-specific network to which the carrier-specific profile 204A, 204B relates.

More particularly, carrier-specific profile 204A includes parameter 206A entries specifying carrier-specific Parameter A, Parameter C, Parameter E, and Parameter F and carrier-specific profile 204B includes parameter 206B entries specifying carrier-specific Parameter B, Parameter C, and Parameter D. Each of the parameters 206A, 206B specify a particular setting or value for device 200. As depicted, profiles 204A, 204B do not include the same parameters 206. In different embodiments, different profiles 204 may include the same, different, and overlapping parameters.

Memory 712 includes a current profile 204' including parameters 206': Parameter A, Parameter C, Parameter D, Parameter E, and Parameter F. During execution, device 200 accesses parameters 206' of current profile 204' in order to operate on a given network. As device 200 is connected with the first carrier's network 208, CCM loader 212 stores carrier-specific profile 204A parameters 206A into current profile 204' for access by device 200. As depicted in FIG. 5, current profile 204' includes Parameter D 206' as a parameter in addition to Parameter A, C, E, and F 206' from profile A 204A, e.g., Parameter D may have been previously manually entered by the user, may remain from an earlier time at which device 200 connected with the second carrier, etc. In an embodiment, CCM loader 212 copies the values from the carrier-specific profiles 204A, 204B to the current profile 204'. In another embodiment, CCM loader 212 establishes a link or reference from relevant current profile 204' parameters to the corresponding specified carrier-specific profile parameters 206A, 206B.

The devices described herein may utilize application programming interfaces (APIs), sometimes referred to as runtime environments and software platforms, that are installed onto their local computer platform and which are used, for example, to simplify operations of such devices, such as by providing generalized calls for device specific resources. Further, some such APIs provide software developers the ability to create software applications that are fully executable on such devices. In addition, some of such APIs may be operationally located between the computing device system software and the software applications such that the computing device computing functionality is made available to the software applications without requiring the software developer to have the specific computing device system source code. Further, some APIs may provide mechanisms for secure communications between such personal devices (i.e., clients) and remote devices (i.e., servers) using secure cryptographic information.

Examples of such APIs, some of which are discussed in more detail below, include versions of the Binary Runtime Environment for Wireless® (BREW®) developed by Qualcomm, Inc., of San Diego, Calif. BREW® is sometimes described as a thin veneer existing over a computing device's (typically a wireless cellular phone) operating system, which, among other features, provides interfaces to hardware features particularly found on personal computing devices.

BREW® is further includes, at least, the one advantage of being able to be provided on such personal computing devices at a relatively low cost with respect to demands on such device resources and with respect to the price paid by consumers for devices containing the BREW® API. Other features associated with BREW® include its end-to-end software distribution platform that provides a variety of benefits for wireless service operators, software developers and computing device consumers. At least one such currently available end-to-end software distribution platform includes logic distributed over a server-client architecture, where the server performs, for example, billing, security and application distribution functionality, and the client performs, for example, application execution, security and user interface functionality.

One or more of the described embodiments are used in conjunction with a runtime environment (API) executing on the computing device. One such runtime environment (API) is Binary Runtime Environment for Wireless® (BREW®) software previously discussed. However, one or more of the described embodiments can be used with other types of runtime environments (APIs) that, for example, operate to control the execution of applications on wireless client computing devices.

Figure 6:
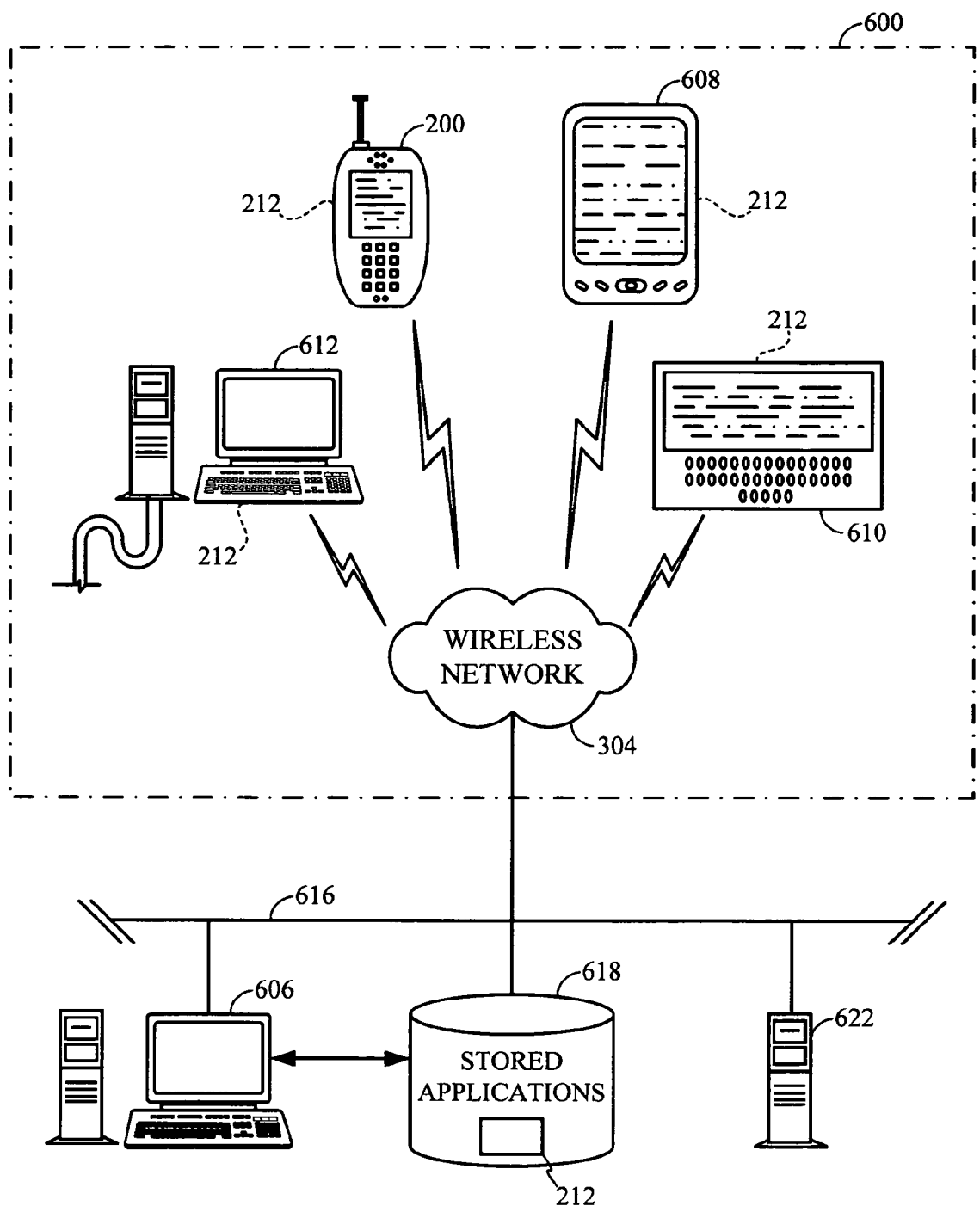
FIG. 6 is diagram of a wireless network architecture supporting client devices and servers in accordance with an embodiment.

FIG. 6 depicts a block diagram of one exemplary embodiment of a wireless system 600. System 600 can contain client devices, such as a cellular telephone, e.g., wireless device 200, in communication across a wireless network 304 with at least one application download server 606 that selectively transmits software applications and components to wireless devices, such as wireless devices 200, across a wireless communication portal or other data access to the wireless network 304. As shown here, the wireless (client) device can be a cellular telephone, e.g., wireless device 200, a personal digital assistant 608, a pager 610, which is shown here as a two-way text pager, or even a separate computer platform 612 that has a wireless communication portal. For example, wireless device 200 includes a transceiver or wireless device for transmitting and receiving data, a processor for executing instructions and controlling operation of the wireless device, and a memory for storing the executable instructions, a CCM loader 212 (FIG. 2), and a CCM 202 (FIG. 2). The embodiments can thus be realized on any form of client device including a wireless communication portal, e.g., a wireless device, including without limitation, wireless modems, PCMCIA cards, personal computers, access terminals, telephones, or any combination or sub-combination thereof.

The application download server 606 is shown here on a network 616 with other computer elements in communication with the wireless network 304. There can be a stand-alone server 622, and each server can provide separate services and processes to the client devices 200, 608, 610, 612 across the wireless network 304. System 600 may also include at least one stored application database 618 that holds the software applications, e.g., a CCM loader 212, that are downloadable by the wireless devices 200, 608, 610, 612 (the CCM loader application is indicated as being downloadable to the wireless devices by a dashed line). However, those skilled in the art will appreciate that the configuration illustrated in FIG. 6 is merely exemplary. Accordingly, other embodiments can include one of more servers that can each perform all the described functions and contain all necessary hardware and software, or can contain only selected functionality.

In FIG. 7, a block diagram is shown that more fully illustrates system 600, including the components of the wireless network 304 and interrelation of the elements of the exemplary embodiments. System 600 is merely exemplary and can include any system whereby remote client devices, such as wireless client computing devices 200, 608, 610, 612 communicate over-the-air between and among each other and/or between and among components connected via a wireless network 304, including, without limitation, wireless network carriers and/or servers. The application download server 606 and the stored application database 618 communicate with a carrier network 700, through a data link, such as the Internet, a secure LAN, WAN, or other network. Stored application database 618 includes a CCM loader 212 according to the above-described embodiments for download to each of the wireless client computer devices 200, 608, 610, 612. Wireless client computer devices 200, 608, 610, 612 download a copy of CCM loader 212 from stored applications database 618. In the embodiment shown, a server 620 can include the application download server 606, distribution server 622 and the stored application database 618. However, these servers can also be independent devices.

Still referring to the embodiment of FIG. 7, carrier network 700 controls messages (generally being data packets) sent to a messaging service controller ("MSC") 702. Carrier network 700 communicates with the MSC 702 through another communications link, such as another network, the Internet, and/or POTS ("plain ordinary telephone system"). Typically, the network or Internet connection between carrier network 700 and MSC 702 transfers data, and the POTS transfers voice information. MSC 702 may be connected to multiple base stations ("BTS") 704, such as by at least one communications link, including both a data network and/or the Internet for data transfer and POTS for voice information. BTS 704 ultimately broadcasts messages wirelessly to the wireless communications devices, such as cellular telephones 602, in an over-the-air protocol such as short messaging service ("SMS"), etc.

In the embodiment of FIG. 7, each wireless device 200 may include a computer platform 706 that can receive and execute software applications and display data transmitted from computer system 620 or other network servers 622. Computer platform 706 may include an application-specific integrated circuit ("ASIC") 708, or other chipset, processor, microprocessor, logic circuit, or other data processing device. ASIC 708 may be installed at the time of manufacture of wireless device 200. ASIC 708 or other processor may execute an application programming interface ("API") layer 710 that interfaces with any resident programs, e.g., CCM loader 212, in a memory 712 of the wireless device. API 710 is a runtime environment executing on the computing device, or wireless device 200 in this case. One such runtime environment is Binary Runtime Environment for Wireless® (BREWS®) software, although other runtime environments may be utilized that, for example, operate to control the execution of applications on wireless computing devices. Memory 712, for example, can be comprised of at least one of read-only and random-access memory (ROM and RAM), EPROM, EEPROM, flash cards, and any memory common to computer platforms. The computer platform 706 may also include a local database 714 that can hold the software applications, e.g., CCM loader 212, CCM 202, files, or data not actively used in memory 712. Local database 714 may include at least one of flash memory cells, magnetic media, EPROM, EEPROM, optical media, tape, a soft disk, a hard disk, and any other type of secondary or tertiary memory. Thus, in the embodiment of FIG. 7, each wireless device 200 may be loaded with applications such as CCM loader 212, CCM 202, one or more profiles 204, and/or data from computer system 620 in accordance with system 600.

By using CCM 202, the manufacturer of device 200 is able to configure the device for operation on one or more carrier communication networks, e.g., first wireless network 208 and a second wireless network 210. That is, device 200 need not be modified by a vendor or a manufacturer in order to operate on a particular telecommunication carrier's communication network 208, 210. Additionally, an individual carrier need only supply predetermined carrier-specific parameters 206 to device 200 in order to enable the device to operate in conjunction with the carrier's network. CCM 202 encapsulates carrier-specific parameters in one or more carrier-specific profiles 204 for device 200.

CCM 202 encapsulates the differences in carrier device requirements as parameters 206, e.g., dynamic resource files, selectable during operation of device 200.

In another embodiment, CCM 202 is downloadable over the air, i.e., device 200 is able to download carrier-specific parameters 206 using the device's connection to wireless network 208. In yet another embodiment, CCM 202 is downloadable by a connection to a computer system or via a readable medium connectable to device 200, e.g., a memory card.

In an embodiment, a user of device 200 may choose a specific carrier configuration by entering proper inputs on the device, directly or remotely. The user may choose to enable device 200 to operate under one of many carriers (service providers) based on some changes in the users' needs, e.g., cost, geography, roaming, travel, security, specific technology (e.g., CDMA, TDMA, OFDMA, etc.), and the like.

In one embodiment, device 200 automatically detects the need to use a predetermined profile 206 stored in CCM 202. handset manufacturer may choose a specific carrier configuration and customize itself based on some changes in the operating environment and/or users' needs, e.g., roaming and or traveling into a new area, entering an area serviced by a specific technology (e.g., CDMA, TDMA, OFDMA, etc.), and the like.

Using CCM 202, device vendors and manufacturers need not worry about customizing each device to meet each carrier's specific requirements. Device vendors and manufacturers may focus on their market differentiators and use CCM 202 to address carrier's unique requirements. This significantly improves device 200 time to market and quality of devices.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of customizing a customizable wireless device to a predetermined configuration, comprising:
establishing a connection between a customizable wireless device and a first carrier network, wherein the customizable wireless device is configured with at least one carrier-specific profile, the profile including a plurality of parameters, for the first carrier network;
receiving a network switch input comprising a user-specified desired parameter against which possible networks are to be compared prior to establishing communication with the wireless device;
obtaining a profile, the profile including a plurality of parameters, for a second carrier network from a server of the second carrier network, wherein the profile is obtained over the connection established between the wireless device and the first carrier network, in response to the network switch input and based on a comparison of at least one carrier-specific parameter for the second carrier network against the user-specified desired parameter of the network switch input, wherein the profile for the second carrier network includes the at least one user-specified desired parameter;
storing the obtained profile in a Carrier Customization Module (CCM) as at least one dynamic resource file;
managing the carrier-specific profiles using a CCM loader;
executing, with a processer, an Application Programming Interface (API) layer that interfaces with the CCM loader; and
modifying the customizable wireless device to access the second carrier network using the obtained profile for the second carrier network.

2. A method as claimed in claim 1, further comprising:
connecting the modified wireless device to the second carrier network responsive to a connection input received by the wireless device.

3. A method as claimed in claim 2, wherein the connection input is at least one of a user input and a wireless device-generated input.

4. A method as claimed in claim 1, wherein the network switch input comprises at least one of a user input, a carrier-specific input, and a wireless device-generated input.

5. A method as claimed in claim 4, wherein the wireless device-generated input is detection by the wireless device of a geographic change.

6. A method as claimed in claim 1, wherein the at least one carrier-specific parameter comprises at least one of wireless device-specific features and carrier-specific features.

7. A method as claimed in claim 6, wherein the wireless device-specific features include display parameters, carrier network determination parameters, dialing feature parameters, and user interface parameters.

8. A method as claimed in claim 6, wherein the carrier-specific features include voice parameters, messaging parameters, and data parameters.

9. A method as claimed in claim 1, wherein the wireless device includes at least one carrier-specific profile including the at least one carrier-specific parameter.

10. A method as claimed in claim 9, wherein the modifying step comprises selecting from among one or more carrier-specific profiles.

11. A memory or a computer-readable medium storing instructions which, when executed by a processor, cause the processor to perform the method of customizing a wireless device as claimed in claim 1.

12. A wireless device processor configured to perform the method of customizing a wireless device as claimed in claim 1.

13. The method of claim 1, wherein receiving the network switch input is based on lack of detection of the connection with the first carrier network.

14. The method of claim 1, further comprising:
receiving inputs enabling the wireless device to operate with a plurality of carriers based on a predetermined change in a user need;
obtaining, over a connection between the wireless device and the first carrier network, a plurality of predetermined carrier profiles corresponding to the plurality of carrier networks, wherein the plurality of predetermined carrier profiles are obtained from plurality of servers, each server corresponding to one of the plurality of carrier networks;
automatically detecting the predetermined change in the user need; and wherein modifying the wireless device to access the second carrier network is based on the automatically detecting, and wherein the modifying further comprises using a predetermined one of the plurality of predetermined carrier profiles corresponding to the second carrier network.

15. The method of claim 14, wherein the user need comprises a communication protocol technology comprising one of CDMA, TDMA, and OFDMA.

16. A carrier customization module system for a customizable wireless device, comprising:
   a carrier customization module loader executable by a customizable wireless device configured with at least one carrier-specific profile, the profile including a plurality of parameters, for a first carrier network, wherein the carrier customization module is arranged to:
      receive a network switch input comprising a user-specified desired parameter against which possible networks are to be compared prior to establishing communication with the customizable wireless device;
      select at least one carrier-specific parameter for a second carrier network from among one or more carrier-specific parameters during operation of the wireless device and responsive to the network switch input received by the customizable wireless device;
      obtain a profile, the profile having a plurality of parameters, for the second carrier network from a server of the second carrier network, wherein the profile is obtained over a connection between the wireless device and a first carrier network, in response to the network switch input and based on a comparison of at least one carrier-specific parameter for the second carrier network against the user-specified desired parameter of the network switch input, wherein the profile for the second carrier network includes the user-specified desired parameter;
      store the obtained profile in the carrier customization module as at least one dynamic resource file;
      manage the carrier-specific profiles using a CCM loader;
      execute, with a processor, an Application Programming Interface (API) layer that interfaces with the CCM loader; and
      modify the customizable wireless device to access the second carrier network using the obtained at least one carrier-specific parameter for the second carrier network.

* * * * *

UNITED STATES PATENT AND TRADEMARK OFFICE
CERTIFICATE OF CORRECTION

| | | |
|---|---|---|
| PATENT NO. | : 7,636,333 B2 | Page 1 of 1 |
| APPLICATION NO. | : 11/280718 | |
| DATED | : December 22, 2009 | |
| INVENTOR(S) | : Premkumar Jothipragasam | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 390 days.

Signed and Sealed this

Twenty-first Day of December, 2010

David J. Kappos
*Director of the United States Patent and Trademark Office*